: 3,127,326
PROCESS FOR PREPARING 6-AMINO-
PENICILLANIC ACID
Fritz Lindner and Karl Heinz Wallhäuser, Hofheim,
Taunus, and Adolf Mager, Niedernhausen, Taunus,
Germany, assignors to Farbwerke Hoechst Aktienge-
sellschaft vormals Meister Lucius & Brüning, Frankfurt
am Main, Germany, a corporation of Germany
No Drawing. Filed Mar. 22, 1960, Ser. No. 16,639
Claims priority, application Germany Mar. 25, 1959
7 Claims. (Cl. 195—36)

The various known penicillins possess the following chemical basic structure:

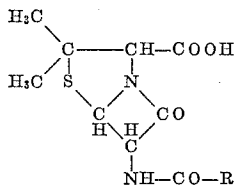

and differentiate from each other only by the grouping designated by R; for instance in the case of—

Penicillin G:

Penicillin V:

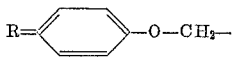

Penicillin K:

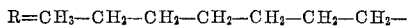

6-amino-penicillanic acid of the following constitution is believed to be the common basic substance of all penicillins:

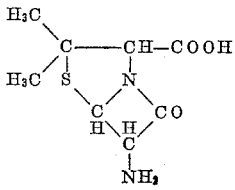

The various penicillins can be prepared from this 6-amino-penicillanic acid by reaction with the corresponding acid chlorides.

6-amino-penicillanic acid has recently been obtained according to research work carried out by F. R. Batchelor, F. P. Doyle, J. H. C. Nayler and G. N. Robinson (Nature, vol. 183, No. 4656, Jan. 24, 1959, from fermentation solutions of *Penicillium chrysogenum* W. 51.20.

Now we have found that 6-amino-penicillanic acid can be obtained by causing proteolytic enzymes to act on penicillins and isolating the 6-amino-penicillanic acid from the reaction mixture, if necessary after separation of the penicillin that has not reacted. As penicillins there enter into consideration for example penicillin G or penicillin V. It is possible to start from pure penicillins or their salts or from penicillins in the form of the crude culture solutions or from the concentrations obtained in the process of manufacture in aqueous buffer solutions.

As proteolytic enzymes there are suitable, for instance, trypsin, chymotrypsin, polypeptidases, papain, fungus proteases, the animal and vegetable cathepsins as well as pepsin. The various enzymes can be used in pure form as well as in the form of crude products, for instance organ- or fungus dry preparations or crude solutions. For instance, a pancreatic extract is suitable as organ extract.

The enzyme action on the solutions of the penicillin salts is effected at the temperature- and pH-conditions entering into consideration for the individual enzymes. Upon action of the enzyme the penicillin that has not reacted is favorably extracted, while showing an acid reaction, from the solution by means of organic solvents and the 6-amino-penicillanic acid is isolated from the aqueous mother liquor according to known methods. It has proved advantageous to inactivate or to remove the enzymes prior to the further treatment. For this stage of the process there enter into consideration, for example, the precipitation with reagents for the precipitation of protein or the treatment with organic solvents according to Sevag.

As already mentioned, there can be used as starting product apart from pure crystallized penicillin salts likewise favorably the culture solutions at first obtained in the production of penicillin or, in aqueous buffer solutions, the solutions of penicillins obtained in the recovery process.

The following examples serve to illustrate the invention but they are not intended to limit it thereto.

*Example 1*

0.5 gram of the potassium salt of penicillin V is dissolved in 25 cc. of water and mixed with a solution of 100 milligrams of crude papain in 25 cc. of water, activated by cysteine. The pH-value of the batch is adjusted to 5.0 by means of dilute hydrochloric acid and the batch is incubated again for 12 hours at 40° C. with protection by toluene and with constant pH-value in the water bath. When splitting is finished, the pH-value is adjusted to 2 by means of dilute sulfuric acid and penicillin that has not reacted is removed by double extraction by means of butyl-acetate. The residual neutralized aqueous solution is subjected to lyophilisation and from the dry product thus obtained there is extracted and isolated the 6-amino-penicillanic acid by means of methanol.

*Example 2*

0.5 gram of the potassium salt of penicillin V is dissolved in 48 cc. of water and an active enzyme juice obtained by slow thawing of a frozen cattle pancreas is added. After a pH-value of 6.8 has been adjusted, the reaction mixture is introduced into the water bath of 40° C. and split by the enzyme with protection by toluene for 12 hours while a pH of 6.8 is maintained. The mixture is then adjusted to pH=2 by means of dilute sulfuric acid and the unreacted penicillin is removed by shaking it out twice with 30 cc. of butyl-acetate each. In order to remove the enzyme protein, the aqueous solution is treated according to the Sevag process by shaking it out with a mixture of chloroform and amyl alcohol.

The further treatment is carried out as described in Example 1.

*Example 3*

0.5 gram of the sodium salt of penicillin G is dissolved in 25 cc. of water and mixed with 200 milligrams of a dry preparation of fungus protease which had been dissolved in 25 cc. of water. The pH-value of the solution is adjusted to 5.3 and maintained by occasional addition of dilute sodium hydroxide solution during the splitting by the enzymes which is carried out within 12 hours with protection by toluene in the water bath at +37° C. The reaction mixture is then adjusted to a pH-value of 2 by means of dilute sulfuric acid and penicillin that has not reacted is removed by shaking it out twice with butyl-acetate. The elimination of protein is carried out in known manner by means of trichloroacetic acid. In the remaining aqueous phase the 6-amino-penicillanic acid formed is identified in the bioautogram after neutralisation. The dry preparation of fungus protease can be obtained, for instance, by:

(1) Lyophilisation of the culture solution of, for example, *Penicillium chrysogenum*, (2) By disintegration of the mycelium of, for example, *Penicillium chrysogenum*, extraction and lyophilisation of the solution. There can likewise be used the enzymes further purified by fractionation of alcohol.

Example 4

To 1 liter of a culture filtrate solution of *Penicillium chrysogenum* with 7,000 units of penicillin V/milliliter there is added a solution of 1 gram of crude papain in 100 cc. of water. The solution is adjusted to pH 6.5 and split by the enzymes within several hours with protection of toluene at 40° C. while maintaining this pH-value. When splitting by the enzymes is finished the pH-value is adjusted to 2.0 by means of acid and the penicillin that has not reacted is removed by extraction with 0.5 liter of butyl-acetate. In order to remove the enzyme and ballast protein substances still contained in the residual aqueous solution, the solution is treated in the usual manner by means of trichloracetic acid. The solution free from protein is neutralised, the solution containing the 6-amino-penicillanic acid is lyophilized and the dry preparation is worked up to pure 6-amino-penicillanic acid by extraction with alcohol.

Example 5

4 liters of a culture filtrate solution of *Penicillium chrysogenum* of 7,000 units of penicillin V/milliliter are shaken out with 2 liters of butyl-acetate. After separation of the butyl-acetate phase containing penicillin the latter is extracted with 200 cc. of sec.-sodium phosphate in an aqueous solution of 2% strength.

The aqueous buffer solution containing penicillin after separation from the butyl-acetate is adjusted to a pH-value of 6.5 and treated with protection by toluene with 4 grams of a mixture of equal parts of chymotrypsin and trypsin. The spitting by the enzymes is carried out within 12 hours at 40° C. while maintaining the pH-value.

The further treatment is carried out according to Example 4.

Example 6

0.5 gram of the sodium salt of penicillin G is dissolved in 50 milliliters of water and a strongly enzymatic cell homogenate from 0.5 gram of *E. coli* dry cells is added. The mixture is incubated for 12 hours at a pH-value of 7.5 to 8.0 at 40° C. with protection by toluene. The penicillin that has not reacted is then removed at a pH-value of 2.0 by twice shaking it out with 25 milliliters of butyl-acetate each time. The residual solution is adjusted to a pH-value of 6.0, freed, in known manner, from protein and concentrated under reduced pressure to about 25 milliliters. A pH-value of 4.3 is adjusted by means of concentrated hydrochloric acid. After standing for some time in the cold 6-amino-penicillanic acid separates off and after filtering with suction is washed with water and acetone; it is then dried under reduced pressure. The recrystallization is carried out by dissolution in water at a pH-value of 7.0 and reacidification by means of hydrochlorid acid. Melting point 208° C. to 209° C.

Example 7

0.5 gram of the potassium salt of penicillin V is added to 100 milliliters of a culture filtrate from a 14 to 28 day old culture of *Proteus vulgaris* and the enzymes contained therein are allowed to act with protection by toluene for 12 hours at a pH-value of 7.5 to 8.0 and at 40° C.

The penicillin that has not been split by the added bacterial enzymes is then removed by shaking it out with butyl-acetate and after preliminary elimination of protein the penicillanic acid that has formed is obtained from the neutral solution in the manner described in Example 6 by strong concentration under reduced pressure and adjustment to a pH-value of 4.3. The recrystallisation is likewise carried out according to Example 6.

Example 8

4 liters of a culture filtrate of *Penicillium chrysogenum* with an activity of 7,000 units/milliliter are extracted with 2.0 liters of butyl-acetate at a pH-value of 2.0. The extract is shaken back with 200 milliliters of phosphate buffer (2% strength, $Na_2HPO_4$). After elimination of the residual butyl-acetate 100 milliliters of an about 4 week old, autolysed culture of *Bac. subtilis* is added. After an action of 18 hours of the enzymes contained in the autolysate at a pH-value of 7.5 to 8.0 at 40° C. with protection by toluene the penicillin that did not react is removed by extraction and the 6-amino-penicillanic acid remained in the residual solution is isolated as described in Example 6.

We claim:

1. A process for preparing 6-amino-penicillanic acid which comprises causing a proteolytic enzyme selected from the group consisting of papain and proteases obtained from the microorganisms *E. coli, Proteus vulgaris,* and *Bac. subtilis,* to act on penicillins, and then isolating 6-amino-penicillanic acid from the reaction mixture.

2. A process as in claim 1 wherein a member of the group consisting of pure penicillins and the salts of penicillins is used as starting substance.

3. A process as in claim 1 wherein said penicillins are reacted with said enzymes in the culture solutions for said penicillins.

4. A process as in claim 1 wherein said penicillins are reacted with said enzymes in aqueous buffer solutions.

5. A process as in claim 1 wherein said enzymes are reacted in unrefined dry form.

6. A process as in claim 1 wherein said enzymes are reacted in the form of unrefined enzyme extracts.

7. The process for the preparation of 6-amino-penicillanic acid which comprises treating an aqueous solution of a biosynthetically prepared penicillin with an aqueous solution of papain at a pH of 5 and at a temperature of about 37° C.

References Cited in the file of this patent

Nature; vol. 183, pages 257–258, January 24, 1959. (Copy in P.O.S.L.)

J. Agr. Chem. Soc. Japan, 23, page 411 (1950). (Copy in P.O.S.L.)

Enzymes, Waksman & Davidson, pages 115–118, 1926, published by Williams & Wilkins.